United States Patent 3,222,158
.ted Dec. 7, 1965

3,222,158
ORGANOTIN COMPOSITIONS
Frank J. Sowa, 9 Besler Ave., Cranford, N.J.
No Drawing. Filed May 26, 1960, Ser. No. 31,828
17 Claims. (Cl. 71—2.3)

The present invention relates to novel organotin compositions. More particularly, the invention is concerned with new compositions containing organotin compounds, and methods of preparing same, the compositions being characterized by their high organotin concentration and their solubility in water and a variety of organic compounds.

Organotin compounds have been known for many years and recently have been found useful for a variety of purposes. For instance, it is known that small amounts of di-butyltin dilaurate stabilize polyvinyl chloride against heat and light discoloration. Tetraphenyltin functions in much the same manner in connection with chlorinated dielectrics. These organotin compounds have also served as hydrogen chloride and oxygen scavengers.

Many organotin compounds are useful as fungicides and a number of organotin derivatives are rapidly becoming important factors in industrial control of micro-organisms, for example, in paper mills and cooling water systems for slime control, textile, paper, plastics, paints, woods, agriculture, leather, laundries, starches and adhesive treatments. These compounds are also used as sanitary chemicals in hospitals and homes and for a wide variety of other purposes, such as polymerization of isocyanate foams and certain unsaturated compounds, plant hormones, veterinary compositions and mothproofing.

Despite their extensive use, these organotin compounds suffer from a number of disadvantages which have limited their field of application. For one thing, most of the effective compounds are either insoluble or only slightly soluble in water solutions and they are also relatively sensitive to acids or bases or water alone to form insoluble compositions. This seriously limits the extent or effectiveness of use of these compounds. Typical is the case of bis(tributyltin) oxide which is insoluble in water and difficult to apply in many cases. When common organic solvents are used, only concentrates with a relatively low organotin content (e.g., around 3 to about 10% by weight) are possible for aqueous application and even in these cases, when the solutions are added to water, unstable compositions result with separation of the active ingredient to give non-uniform treatment at the best. Ordinary solvents also limit considerably the types of organotin compounds which can be used. Flammability and toxicity of solvents are also important limiting factors. Additionally, common organic solvents are frequently not compatible with products treated or are otherwise undesirable. Many emulsifying agents in water are affected when the applications require acidic or alkaline solutions resulting in the separation or deactivation of the active ingredients.

It will be appreciated from the foregoing that, despite the advantages offered by organotin compounds, much remains to be done to widen the scope, use and effectiveness of these compounds, particularly with respect to the preparation of satisfactory solutions thereof in water and other solvents. Accordingly, the principal object of the present invention is to provide novel organotin-containing compositions which are free from the disadvantages heretofore noted. A more specific object of the invention is the provision of novel concentrates and solutions containing organotin compounds in relatively high concentrations. Another object of the invention is to provide organotin compositions which are soluble in water and many common organic solvents to give stable solutions which are effective for many different applications. Other objects will also be hereinafter apparent.

Broadly stated, the foregoing objects are realized by the provision of compositions, in solid, liquid or paste form, comprising one or more organotin compounds dissolved in a surfactant which must contain both hydrophobic and hydrophilic groups in a critical relationship in order to give the most effective products, e.g., stable concentrates of the organotin compounds which can be diluted with water and other solvents to make suitably useful solutions.

The nature and characteristics of the surfactants used herein are detailed below. For the present, it is sufficient to note that the hydrophobic and hydrophilic groups must be properly balanced for optimum results, the hydrophobic group having good solubility or affinity for the organotin compound and little or no solubility in water while the hydrophilic group has good solubility or affinity for water and usually has little or no solubility for most oil-based compounds, e.g., the organotin compounds.

Any of the known organotin compounds are suitable for use herein. This includes divalent and tetravalent tin compounds containing organic radicals attached to the tin through carbon atoms. Thus, there are contemplated compounds having a formula selected from the group consisting of:

$$Y_nSnX_{4-n}; (Y_2SnO)_a \text{ and } (YSnO_{1.5})_a$$

wherein $n$ is an integer of from 1 to 3 and Y, X and $a$ have the meanings noted below.

The compounds corresponding to $(Y_2SnO)_a$ may be dimers or chain polymers while those corresponding to $(YSnO_{1.5})$ may be dimers or cross polymeric substances. The value of the integer $a$ will be from two to 100 or more.

In the compounds corresponding to $Y_nSnX_{4-n}$, the Y substituent may be an alkyl group from $CH_3$ to $C_{18}H_{37}$; an alkenyl radical such as vinyl, allyl, butenyl; a cycloalkyl radical such as cyclohexyl; arylalkyl radical such as benzyl; aryl radicals comprising one, two and three membered rings such as phenyl, naphthyl, anthracenyl; heterocyclic radicals such as pyridyl, furyl and thiophenyl. These various radicals may have simple substituents such as halo, amino, hydroxyl, and alkoxy groups as in the case of 2-chloroethyl, chlorophenyl, 3-aminopropyl, aminonaphthyl, methoxyphenyl, etc.

The X substituent may be an inorganic or organic radical or anion attached to the tin by other than a (C=Sn) bond. Typically, X may be a halogen such as chloride, bromide, iodide or fluoride; organic acid radicals such as acetate, propionate, 2-ethylhexoate, laurate, maleate, lactate, gluconate, oleate, and undecenylate; aryloxide such as phenoxide, chlorophenoxides, 2-phenylphenoxide, and nonylphenoxide; or it may be an alkyltinoxy radical such as tributyltinoxy $(C_4H_9)_3$ Sn—O— which would give the dimeric compound bis(tributyltin)oxide when Y is butyl and $n$ is 3.

Specific examples of compounds contemplated for use herein include, trimethyltin iodide, triethyltin bromide, tripropyltin chloride, tributyltin chloride, trilauryltin fluoride, triphenyltin chloride, tributyltin acetate, tributyltin oleylsarcosinate, tributyltin pentachlorophenate, dibutyltin dilaurate, dimethyltin dioctoate, dioctyltin di-2-ethylhexoate, distearyltin dipropionate, naphthyltin trichloride, diphenyltin dichloride, chlorophenyltin trichloride, phenyltin trichloride, phenyl butyl tin dichloride, dibutyltin sulfide, tributyltin 2-mercaptobenzothiazoate, dimyristyltin dibromide, triamyltin fluoride, dimethyltin dichloride, dimethyltin disulfide, tributyltin oxide also known as bis(tributyltin) oxide, trimethyltin oxide, bis(triethyltin) oxide, bis(tripropyltin) oxide, bis(tri isobutyltin) oxide, bis(tridecyltin) oxide, bis(triphenyltin) oxide, dipropyltin oxide, dibutyltin oxide, nonyltin oxide, pentadecyltin oxide, dibutyltin dinaphthenate, etc.

Surfactants found suitable for use herein may be generally represented by the formula:

$$R(R'O)_{x+y}H$$

where R is a hydrophobic radical, typically one selected from the group consisting of alkoxy (including hydrophobic alkylcycloalkoxy such as decylcyclohexyloxy); alkylated aralkyloxy (e.g., octyl benzyloxy); aryloxy; alkaryloxy; fatty acid amido; alkylamino and fatty acid radicals; (R'O) is an oxyalkylene group; $x$ is an integer equal to the total number of hydrophilic (oxalkylene) groups required to give threshold solubility to the hydrophobic radical at room temperature (e.g., around 20° C.) while $y$ is an integer from 1 to 15 except in the case where R is a disubstituted amide or amine, and includes an oxyalkylene group $(R'O)_{x+y}$. In the latter case, the sum of the $x$'s should be equal to the number of hydrophilic groups required to give threshold solubility and the sum of the $y$'s should be from 2 to 25. The surfactant selected must by itself show solubility in water (e.g., a minimum of about 3% by weight) and should also be a good solvent for the organotin compound utilized.

The term "threshold solubility," as used herein, is intended to mean a water solubility corresponding to about 1% by weight. The value of $x$ is determined by condensing oxyalkylene groups with a suitable compound, (e.g., nonylphenol) which contains a hydrophobic radical which is either water-insoluble or has a low water-solubility (e.g., less than about 0.5% by weight solubility in water at about 20° C.). It will be appreciated that this may be accomplished, for example, by reacting an alkylene oxide with a compound having the formula RH wherein the hydrogen (H) is reactive and forms a condensation product with the alkylene oxide. The oxyalkylene groups are added one at a time and $x$ is the number of oxyalkylene groups which will render the condensation product soluble to the extent of 1% in water but insoluble to the extent of 2% in water.

When the desired hydrophobic-hydrophilic balance is present in the surfactant as described above, the surfactant and organotin compound are mixed together, sufficient surfactant being used to dissolve essentially all of the organotin compound therein. The resulting concentrate is distinguishable, both as to its composition and properties, from emulsifiable concentrates of the organotin compound with an emulsifying agent which may or may not be the same as the instant surfactants. In particular, the concentrates of the present invention are basically solutions of the organotin compound dissolved in relatively large amounts of surfactant whereas emulsions of the organotin compound contemplate minor amounts of emulsifying agent and, as a result, do not offer the advantages of the present compositions.

Advantageously, the concentration of the organotin compound in the present compositions may be adjusted to give products which can be dissolved in water to make suitably stable solutions of varying degrees of concentration for applications requiring neutral, acidic or alkaline conditions. These stable aqueous solutions can be used by themselves, for various purposes, or they may be added to solutions containing caustic soda or hydrochloric acid or other alkaline or acidic agents for uses involving such agents.

Generally speaking, the concentration of organotin compound in the concentrate will vary from about 10 to 80% by weight based on the weight of concentrate. The remaining 90 to 20% by weight of the concentrate is essentially surfactant, same being sufficient to effectively dissolve the organotin compound. Stated another way, the invention contemplates compositions containing, per part of organotin compound, from 0.25 to 9 parts of surfactant, parts being by weight. Preferred products comprise, per part of organotin compound, from about 0.6 to about 9 parts of surfactant, by weight. Proportions outside the indicated range may also be used depending upon other operating conditions and it will also be appreciated that the amount of concentrate ultimately dissolved in water or other solvent will vary depending upon such factors as the nature of the compound, the solvent and the anticipated uses. Characteristically however, the concentrates of the invention can be used to give stable aqueous or solvent solutions of the organotin compound in higher concentrations than heretofore possible. In the event that the organotin compound by itself (before the addition of any surfactant) exhibits water solubility, a smaller quantity of surfactant may be added for the purpose of modifying the characteristics of the organotin compound to give additional water solubility or other desirable properties.

Of the broad class of surfactants referred to above, a preferred series of compounds suitable for use herein contains either an alkoxy, or aryloxy hydrophobic group in combination with the oxyalkylene hydrophilic groups. In this preferred group of surfactants, R may be either (a) an alkoxy group derived from a straight or branched chain alkanol which is water-insoluble or of low water solubility (e.g., less than about 0.5% solubility in water at about 20° C.) and containing from 8 to 18 carbon atoms; or (b) aryloxy, preferably phenoxy or alkyl phenoxy, e.g., p-butylphenoxy, octyl or isooctylphenoxy, nonylphenoxy, hexadecylphenoxy and diisooctylphenoxy; while (R'O) is an oxyalkylene radical, such as oxyethylene, oxypropylene and oxybutylene, having hydrophilic characteristics, $x$ and $y$ having the meanings stated heretofore.

The preferred group of surfactants noted in the preceding paragraph may be prepared by condensing ethylene oxide or other alkylene oxide with, for example, a straight or branched chain alkanol or a phenol. The following alcohols are typical of those which may be condensed with the alkylene oxides to give suitable surfactants including the hydrophobic group (a) referred to in the preceding paragraph:

2-propylheptanol; 2,6,8-trimethyl-4-nonanol; primary tetramethylnonyl alcohol; tridecylalcohol derived from the oxo process; dodecyl alcohol; 5-ethylnonanol-2; octadecyl alcohol; paracyclohexylcyclohexanol; octanol; nonanol; isononanol; 2-ethylhexanol; isohexadecanol, etc.

Typical compounds which can be reacted with alkylene oxides to give the hydrophobic group (b) above are mono- and polyalkylated phenols, such as isobutylphenol, n-butylphenol, tertiary butylphenol, isooctylphenol, nonylphenol, dinonylphenol, trinonylphenol, isononylphenol, isohexylxylenol, isobutylcresol, isooctyl-2-chlorophenol, isononylcresol, isononylresorcinol, isododecylphenol, n-dodecylphenol, diterpenylphenol, and isohexadecylphenol. It will be appreciated that the reference to nonyl and other alkyl radicals herein is intended to embrace either straight or branched chains. For example, in nonylphenol, the nonyl radical may be either straight or branched depending on the manner in which the phenol is prepared, i.e., by condensing the trimer of propylene with phenol or by reacting nonanol with the phenol.

As typical of the preferred class of surfactants discussed in the preceding paragraphs, there may be mentioned surfactants of the formula R—(R'O)$_{x+y}$H where R is a p-nonylphenoxy radical and (R'O) is an oxyethylene group. In this case, the integer $x$ has a value between 4 and 6 when the threshold solubility for the hydrophobic nonylphenoxy radical is reached. Optimum water solubility for organotin compounds is realized with such surfactants when the value for $y$ is between 3 and 10. Thus, in the case of tributyltin halide (chloride) or the corresponding oxide, maximum water solubility is reached when $y$ is an integer between 3 and 6. When the sum of $x+y$ is equal to 9, 10 or 11, it is possible to prepare a concentrate containing up to 25–30% by weight of bis(tributyltin)oxide or up to 50–60% by weight of tributyltin chloride dissolved in the surfactant without the necessity of bridging agents. These concentrates, when dissolved in water, give suitably stable solutions for use under acidic, basic or neutral conditions.

Another preferred series of surfactants suitable for combination with organotin compounds according to the invention, and falling within the broad surfactant class represented above by the formula $R(R'O)_{x+y}H$, may be illustrated by the following formula:

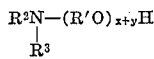

wherein (R'O) is an oxyalkylene radical as indicated heretofore, e.g., oxyethylene, oxypropylene and oxybutylene;

is an alkylamino hydrophobic radical, $R^2$ being alkyl, particularly $C_8H_{17}$ to $C_{18}H_{37}$, or abietyl; and $R^3$ being selected from the group consisting of alkyl, aralkyl, an alkylene dioxyalkyleneamino or $(R'O)_{x+y}H$; $x+y$ having the values indicated heretofore except that when $R^3$ is $(R'O)_{x+y}H$, the sum of the $x$'s represents the total number of hydrophilic (oxyalkylene) groups required to give threshold water solubility to the hydrophobic group and the sum of the $y$'s is an integer from 3 to 25. As specific $R^3$ substituents there may be mentioned methyl to stearyl, benzyl,

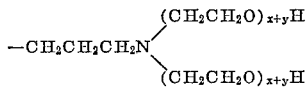

and the corresponding dimethyleneamino radical.

Illustrative of the type of surfactants discussed in the preceding paragraph is the compound:

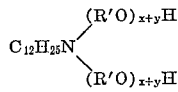

wherein (R'O) is oxyethylene. Threshold solubility is realized when the sum of the $x$'s is two and the sum of the $y$'s may be between 3 and 25, as stated, to give maximum solubility. Essentially equivalent results are obtained when the $C_{12}H_{25}$ radical is replaced by $C_{14}H_{29}$ or mixtures of several long chain alkyl radicals of the type indicated.

Other surfactants effective herein include:

(a) Fatty acid esters of polyoxyalkylene alkanols of the formula $R(R'O)_{x+y}H$ wherein R stands for the radical of a fatty acid, i.e. decanonyl, lauroyl, palmitoyl, stearoyl or oleoyl.

(b) N-substituted fatty acid amides having one or two N-substituted polyoxyalkylene groups, i.e. compounds of the formula $R(R'O)_{x+y}H$ wherein R stands for

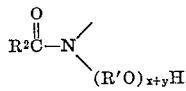

and the values of $R^2$, (R'O), $x+y$ are the same as before. Surfactants (a) and (b) are more susceptible to acid and alkaline hydrolysis, particularly the (a) compounds, than the other preferred compounds mentioned above. Nevertheless, groups (a) and (b) are suitable for many applications. It is essential that the fatty acid contain a rather long or isomeric carbon chain as short chains seem to hydrolize and react rather easily, particularly with organotin oxide type compounds.

It will be appreciated that the surfactants described herein, e.g. the compounds $R(R'O)_{x+y}H$, wherein R is alkoxy or aryloxy, may be modified, if desired, by replacing the end (H) atom with a solubilizing group, e.g. a sulphonic radical as in the case of $R(R'O)_{x+y}SO_3NH_4$. In some instances, the presence of the sulphonic group will increase water solubility. The group also lends itself to the preparation of anionic compositions where this may be desired. On the other hand, some caution is necessary in this regard since certain organotin compounds react with sulphonic radicals to form less water-soluble compositions.

Instead of the sulphonic acid substitution, the end (H) atom of the surfactant may be replaced by other radicals such as —CN, —CH$_2$Cl, —Cl,

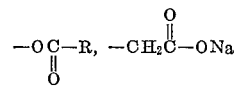

—CH=CH$_2$, etc. For simplicity, all of these substituted derivatives are intended to be embraced by reference herein to the unsubstituted (H) form.

It will also be appreciated that various substituents may be included in the alkoxy- or cycloxy-hydrophobic groups of the surfactants so long as the substituents do not have an adverse effect upon the solubility for the organotin compound used. It will be recognized that once a desirable hydrophobic group is selected and the threshold solubility in water is reached by the addition of hydrophilic groups in the form of oxyalkylene radicals, then 1 to 15 additional oxyalkylene radicals will give the maximum water solubility after which the addition of more oxyalkylene radicals rapidly shows a decrease of water solubility for the organotin compound.

While the theoretical basis for the unique effect of the specific class of surfactants found effective herein is not fully understood, it is believed that this effectiveness results from a coordinate bond formed between the surfactant and the tin compound. For example, in the case where R is either alkoxy or aryloxy including alkaryloxy, a coordinate bond is apparently formed between oxygen as the donor and the tin atom as the acceptor to form complexes represented by the formulae, the R substituent being shown as RO to indicate the Sn—O bond more clearly:

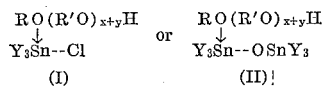

Formula I represents the association, via the coordinate covalent bond, between the surfactant and a trialkyltin chloride while Formula II illustrates the same bond with a bis(trialkyltin) oxide. In both cases, the dotted lines represent the effect of electron drift on the chlorine or oxytrialkyltin radical. This may result in a weaker bond or, in some cases, an ionic bond.

Of the several oxygen atoms of the surfactant, the oxygen atom which has the greatest electron density will be the representative oxygen donor. This mechanism seems to be consistent with the fact that approximately twice the weight of tributyltin chloride in the specific situation discussed above can be dissolved when the anion used is a chloride than when the tin compound is bis-(tributyltin)oxide. Apparently, when the anion is chloride, the tin compound disassociates to form a chloride ion if the oxygen in the surfactant molecule is a sufficiently strong donor. This in turn increases the hydrophilic character and water solubility of the resulting complex and explains the observed difference in water solubility described above. On the other hand, it is likely that the oxytributyltin radical has little tendency to ionize and instead builds up a higher electron density by drift of electrons to increase the polarity of the molecular complex, and that while this radical would become slightly more negative, it would not be sufficiently so to become a hydrophilic group.

The N-alkyl-N-alkanolamine type surfactants represented by the formula:

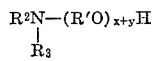

also apparently react with the organotin compounds, particularly the alkyltin and/or aryltin halides, to form an entirely new group of compounds. This reaction is brought about simply by mixing the two reactants together at room temperature (20–25° C.) or, if desired, with the application of some heat (e.g., 70° C.) until a homogeneous solution is obtained. It is belived that the resulting reaction proceeds as follows:

It will be appreciated that (R'O), $R^2$, $R^3$, Y, X and $x$ and $y$ have the meanings stated heretofore but in this particular embodiment, the total of $x+y$ may vary from 1 to 60 or even higher.

These compounds are soluble in oils or aqueous solutions. Where the sum of $x$ and $y$ is a low number, e.g. from about 1 to 5, the products will be oil-soluble and where the sum of $x$ and $y$ is a higher value in excess of about 7, the product becomes water soluble. If the $R^3$ substituent includes an oxyalkylene group, the solubility increases even more rapidly.

Generally, the same type of coordination complexes as discussed in the preceding paragraph, are formed with tin compounds having the formula $Y_3SnOSnY_3$ wherein Y has the meaning previously indicated. It is believed that, in this case, coordination takes place with only one of the tin atoms so as to give the following complex:

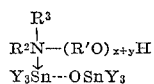

The drift of electrons is such that the second tin atom appears to be a rather poor acceptor. This is suggested by the fact that a lower trialkyl tin concentraton (approximately one-half), is obtained which when diluted with water, gives aqueous solutions of the same clarity.

It will be apparent from the foregoing description that the success of the invention is due to the use of a surfactant containing both hydrophilic and hydrophobic groups with the indicated critical limits. The criticality of these limits is illustrated by the fact that surfactants containing only hydrophilic or hydrophobic groups cannot be satisfactorily used herein. Thus, for example, surfactants such as polyalkylene glycols having the formula:

$$H-O-(R'O)_nH$$

wherein (R'O) is a polyalkyleneoxy group and $n$ has a value between 2 and 150, are ineffective for present purposes. While these surfactants are water-soluble, efforts to use such compounds have demonstrated that they are unsatisfactory in preparing compositions containing organotin compounds, apparently because of the absence of a hydrophobic group.

Additional surfactant compounds which are unsuitable for present purposes are certain oxypropylene polymers represented by the formula:

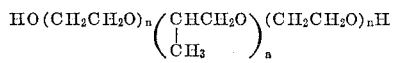

wherein $n$ and $a$ may have a wide range of values adapted to give a variety of desired characteristics. The oxypropylene group

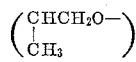

in this type of product is sometimes referred to as hydrophobic but it is not sufficiently so for the purposes of the instant invention.

Similarly, compounds of the following formula do not function effectively to give stable aqueous solutions of organotin compounds:

$$R^4O(R'O)_nH$$

wherein $R^4$ is a short chain alkyl, such as methyl, ethyl or propyl; (R'O) is an oxyethylene group and $n$ is an integer such as 1, 2 or higher, e.g., 7, 12 or 15. Thus, for example, the monoethyl ether of diethylene glycol $C_2H_5O—(CH_2CH_2O)_2H$, is a poor solvent for such organotin compounds as bis(tributyltin) oxide and stable aqueous solutions cannot be formed therewith. The same applies with respect to triethylene glycol $HO(CH_2CH_2O)_3H$. The monobutyl ether of ethylene glycol $$C_4H_9O(CH_2CH_2O)H$$

is a good solvent by itself for bis(tinbutyltin)oxide, but as soon as the glycol and tin compound are added to water, separation of the tin compound occurs almost immediately. This is apparently due to the fact that the short chain alkyls do not posses sufficient hydrophobic characteristics to produce organotin mixtures which give good water stability.

The invention is further described, but not limited, by the following specific examples of various embodiments of the invention.

*Example 1*

The general procedure used to condense alcohols with alkylene oxides to form surfactants is known. The same is true for the condensation of phenolic compounds with alkylene oxide.

In general it might be said that the alcohol or the phenolic compound is mixed with a small quantity of alkali, as a catalyst. The system is swept out with an inert gas such as nitrogen and the alkylene oxide is added while maintaining the temperature in the area of 120° to 160° C.

No catalyst is required when alkylamines are used and the temperature is usually around 100° C. with stirring.

*Example 2*

A composition was prepared by adding 50 grams of tri-n-butyltin chloride to 50 grams of a nonylphenolethylene oxide condensation produce

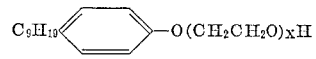

in which X represents 9 to 10 oxyethylene groups and stirring. A solution of the tin compound in the surfactant was obtained.

Although tri-n-butyltin chloride is insoluble in water, the concentrate prepared as above is soluble in water, and forms stable aqueous solutions. It is unaffected by dilute hydrochloric acid solution.

This concentrate is an effective bactericide, fungicide, herbicide, and algaecide. The bacteriostatic and fungistatic properties of this product, identified as composition B, are shown by the data set forth in Table I below.

A solution of 400 parts by weight of the concentrate of this example in a million parts by weight of water gave perfect control of powdery mildrew and excellent control of black stem rust and soil fungi.

A composition containing 100 parts by weight of the concentrate herein in a million parts by weight in water was applied by contact to melon aphids. The insect was completely eradicated. The same concentration (100 p.p.m.) applied to a surface gave a repellent rating of 91 to 100% against the housefly. Thus coating compositions on surfaces containing very small quantities of this composition form a practically housefly-free area.

For the activity of the composition prepared as described in this example, as a herbicide and other physiological activity toward plant life, reference is made to composition B in Table III below. The composition herein also shows the property of translocating in woody plants when applied to the foliage.

Example 3

An organotin concentrate was prepared by adding 25 grams of bis (tributyltin) oxide to 75 grams of a nonylphenol-ethylene oxide condensation product

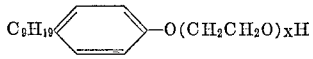

in which X represents an average of 9 to 10 oxyethylene groups.

This concentrate can be dissolved in water and organic solvents to make effective solutions for many different applications. Table I below shows the activity of this composition, identified as composition A, as a bacteriostatic and fungistatic agent while herbicidal and physiological plant activity are shown in Table II under composition A. The product also possesses translocating properties and, when applied as a fly repellent to surfaces, it gives a rating of 91–100% against the housefly. The product may also be used as a contact insecticide when the above concentrate is diluted 100 parts by weight with a million parts by weight of water.

400 p.p.m. (parts per million) of the concentrate in water effectively controls powdery mildew, black stem-rust and soil fungi. The concentrate also is very active towards the control of algae growth and in this respect makes an excellent additive for control of slime in cooling water systems.

Example 4

40.0 grams of o-phenylphenol was added to 10 grams of nonylphenol-ethylene oxide condensation product

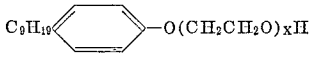

in which X represents 9 to 10 oxyethylene groups and a solution of 11.0 grams of sodium hydroxide dissolved in 36.8 grams of water was added with stirring to this mixture. The contents became warm and the total o-phenylphenol dissolved. To this solution there was added with stirring, 2.2 grams of bis(tributyltin)-oxide until it completely dissolved. This solution is soluble in water and is unaffected by caustic soda solutions.

The composition represents the following equivalents of active ingredients:

|  | Percent |
| --- | --- |
| Bis(tributyltin)oxide | 2.2 |
| o-Phenylphenol | 40.0 |

The sample was found to possess bactericidal and fungicidal properties and is suitable as a biocidal ingredient for cutting oils, agricultural application and for textile treatment. See Table I below for the bacteriostatic and fungistatic activity (composition C).

Example 5

An organotin composition was prepared by adding 35 grams of a nonylphenol-ethylene oxide condensation product.

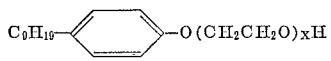

in which X represents 9–10 oxyethylene groups to 2,4,6-trichlorophenol and then 20 grams of diethanolamine while stirring. When the trichlorophenol was completely dissolved, 10 grams of bis(tributyltin) oxide was added with stirring. The resulting product was a rather viscous liquid but poured easily. The product dissolves in water. This product is suitable for slime and algae control in paper mills and cooling water systems, and is also effective as a biocidal composition.

The composition is by weight equivalents, as follows:

|  | Percent |
| --- | --- |
| Bis-(tributyltin)oxide | 10 |
| 2,4,6-trichlorophenol | 35 |

See Table I below for the bacteriostatic and fungistatic activity of this composition, identified in the table as composition D.

Example 6

35 grams of dibutyltin diacetate was added to 65 grams of the same nonylphenol-ethylene oxide condensation product as described in Example 5 above. The resulting liquid concentrate dissolved in water although the original dibutyltin diacetate is practically insoluble in water.

The concentrate possessed biocidal and herbicidal activity and is suitable for use in veterinary preparations. The composition is also useful as polyvinyl chloride stabilizer and as a catalyst for the preparation of polyurethane products. Table I hereinafter shows the biostatic activity of the composition, identified as composition E in the table.

Example 7

50 grams of dibutyltin dichloride was dissolved in 50 grams of the nonylphenol-ethylene oxide condensation product described in Example 5 above.

This concentrate is oil- and water-soluble and is not affected by hydrochloric acid solution. It is suitable for application as a biocide, herbicide, and for veterinary preparations. Table I below shows the bacteriostatic and fungistatic activity of this product, identified as composition F in the table.

Example 8

A solution was prepared by adding 25 grams of bis-(tri-n-butyltin) oxide and 15 grams of N-myristyl-1-methyl-3-hydroxypropylamine to 60 grams of the nonylphenol-ethylene oxide condensation product described in Example 5 above and warming to 50° C. while stirring until complete solution occurred.

This composition dissolves in water and organic solvents to make suitable biocidal compositions with a broad micro-organism spectrum.

Example 9

A solution was prepared as in Example 8 above except using 15 g. of N-myristyl-3-hydroxybutylamine in place of N-myristyl-1-methyl-3-hydroxypropylamine. Water soluble compositions suitable for biocidal and biostatic activity can be prepared.

Example 10

Example 8 was repeated using 15 grams of a mixture comprised of N-myristyl-1-methyl-3-acetoxypropyl amine and N-myristyl-1-methyl-3-hydroxypropylamine. Water and organic-solvent soluble solutions suitable for biocidal activity can be prepared.

Example 11

25 grams of bis(tri-n-butyltin)oxide was added to 75 grams of

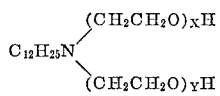

where $x+y$ equals 5 (or 10) oxyethylene groups.

This concentrate can be diluted with water or hydrocarbon solvents to give biocidal compositions suitable for many purposes. The biocidal activity appears to be above that which would be predicted for either composition when used alone.

Example 12

30 grams of bis(tri-n-butyltin)oxide was mixed with 70 grams of

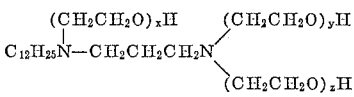

formed by the condensation of N-lauryltrimethylene diamine with ethylene oxide and wherein the sum of $x+y+z$ equals 15, making a clear concentrate which can be diluted with water or organic solvents to make biocidal compositions of excellent activity.

Example 13

35 grams of tributyltin chloride was stirred into 65 grams of the product

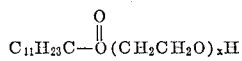

formed by the condensation of lauric acid and ethylene oxide wherein $x$ is 15 oxyethylene groups.

This composition makes aqueous solutions and organic soluble solutions for biocidal activity.

Example 14

To 27.3 grams (0.1 mole) of lauryldiethanolamine was added 25.4 grams (0.1 mole) of tributyltin chloride. The contents were heated to 135° C. for 30 minutes.

The product was a viscous liquid which dissolves readily in organic solvents and is slightly soluble in water but disperses readily in water to make compositions having excellent biocidal activity.

Example 15

To 65 grams of a product which is prepared by the condensation of ten molecules of ethylene oxide with one molecule of nonylphenol is added with stirring 20 grams of bis(tributyltin)oxide and 15 grams of 8-hydroxyquinoline.

The concentrate formed as above has a slightly yellowish color and is very soluble in water and organic solvents. It has excellent bactericidal and fungicidal activity and is suitable for many industrial and agricultural applications such as for seed disinfectants.

Example 16

70 grams of the condensation product, formed by the reaction of 7.5 moles of ethylene oxide with one mole 2,6,8-trimethyl-4-nonanol is mixed with 30 grams of bis(tributyltin)oxide. This concentrate is miscible with water and organic solvents which make suitable bactericides and fungicidal solutions.

Example 17

70 grams of the condensation product formed by the reaction of 10 moles of ethylene oxide with tetramethylnonyl alcohol (a primary alcohol) with 30 grams of bis(tributyltin)oxide is prepared.

This compound is soluble in water and organic solvents and is suitable for bactericide and fungicide use.

Example 18

75 grams of the condensation product formed by the reaction of one mole of hydrogenated tallowamide and 15 moles of ethylene oxide was mixed with 25 grams of bis(tributyltin)oxide.

The concentrate thus formed is a solid which is soluble in water and organic solvents.

Example 19

75 grams of the condensation product formed between one mole of nonylphenol and 7 moles of ethylene oxide was added to 25 grams of triphenyltin chloride and warmed while stirring. This concentrate is sufficiently soluble in water and organic solvents to form effective biocidal compositions. It also has selective herbicidal and insecticidal activity.

Effective insecticidal compositions can be made by dissolving one part of the above triphenyltin concentrate in 2000 parts by weight of water (or up to 100,000 parts of water). The dilution depends upon speed of kill desired and the insect type. Accordingly, higher or lower dilutions may be used. It has been found however, that if the insecticide is used on plant life, it is necessary to use concentrations which are low enough to prevent the phytotoxic activity on plant life. The composition described functions also as an agriculture fungicide, bactericide and algaecide.

Example 20

To illustrate the selective herbicidal activity of the triphenyltin composition, 3.0 cc. of the concentrate prepared as described in Example 19 above was dissolved in one quart of water. This quart of aqueous solution was sprayed uniformly over a 65 square foot area of turf. The turf plot selected for this experiment showed a crabgrass infestation of about 25%. The remaining portion contained desirable lawn grasses heavy in Kentucky blue grass. Applying this composition at the above rate did not injure the described lawn grasses but caused chlorosis to start on the crabgrass. The above procedure was repeated an additional two times at intervals of 5 days. After the third application the crabgrass was dead while the lawn grass still had a healthy green appearance.

Because this compound also possesses good fungicidal activity it functions as a turf fungicide as well as to prevent dollar and brown spots.

Example 21

A concentrated organotin composition was prepared by adding 6 grams of triphenyltin chloride to 34 grams of a condensation product prepared by reacting one mole of nonylphenol with 11 to 12 moles of ethylene oxide. The triphenyltin chloride was reacted and dissolved by stirring and warming to around 70° C. The resulting product was a clear liquid composition.

This composition was found to be an effective inhibitor for algae. Thus, when the above triphenyltin composition is dissolved in water it completely inhibited the growth of various species of algae. For example, the growth of bracteococcus cinnabarius was completely inhibited at 0.05 p.p.m. as triphenyltin equivalent in water but not as 0.01 p.p.m. *Scenedesmus naegeli* was completely inhibited at 0.01 p.p.m. and *Chlorella vulgaria* was inihibited at 0.1 p.p.m. as triphenyltin equivalents in water but not at 0.05 p.p.m.

Example 22

The organotin concentrates described in the foregoing examples are effective for the purpose of controlling the slime content in the processing of pulp and the manufacture of paper. Generally speaking slime is caused by micro-organisms such as bacteria and fungi as well as algae.

The organotin composition described in Example 2 above and which contains 50% tributyltin chloride equivalents in combination with the nonylphenol-ethylene oxide condensation product has a number of advantages over other agents used in the past and presently used for slime control. For example, this composition is water soluble and thus a uniform solution is obtained. Additionally, the composition is more slowly exhausted from the slurry or white water and it is not deactivated by acidic or alkaline solutions which are frequently encountered in a pulp and paper mill operation. Furthermore, as noted above, the composition is effective for controlling the growth of algae.

For use in slime control, the composition described in Example 2 above may be applied at the beater stage of operation or other suitable areas such as to the white water. Depending upon the degree of infestation, the organotin concentrate is added at a rate of around 0.1 to 1.0 pound of organotin concentrate (Example 2) for each ton (bone dry basis) of pulp processed into paper. This rate gives effective control of slime in the paper manufacturing operation.

Example 23

The organotin concentrates prepared as described in Example 2 and Example 3 were used to control slime in industrial cooling water systems.

By continuous or periodic addition of either organotin composition described at a rate around 4.0 to 25 parts by weight to one million parts by weight of cooling water, depending upon the degree of infestation, effective control of slime caused by bacteria, fungi and algae is maintained, in industrial cooling water systems.

Example 24

The organotin concentrate described in Example 5 above was used in aqueous and organic solvent solutions to treat wood and lumber. When the diluted solutions are sprayed over lumber, or the lumber immersed in such diluted solutions, bacterial, fungal and algae growth is inhibited. Thus the green and black staining frequently encountered on lumber is stopped. This improves the value and quality of lumber and retards degradation and odors usually attributed to mold and algae growth.

Example 25

One to 3 percent by weight of the organotin compositions described under Example 2 or Example 3 above were mixed with industrial and household cleaners and the resulting products were diluted 1 part to 20 parts, or even 40 parts, by weight with water. When this diluted detergent was used to clean a surface, it inhibited all organisms present, and after an hour the surface was free of live micro-organisms. Typical detergents contained such ingredients as trisodium phosphate, sodium polyphosphate, alkyl aryl sulfonates dissolved in water.

When the organotin compositions described under Examples 2 or 3 above, were incorporated in emulsifiable oil concentrates to the extent of one to four percent based upon the weight of oil used, they served as excellent compositions to prepare oily cloths for industrial dusting or wiping purposes. The oil concentrates were diluted with water and applied to the cloth in a laundary or by spraying on the surface. The ratio of oil to water could be varied but is usually about 5 parts of oil to 20 parts of water and the resulting pickup on fabric is 30 to 50%.

The data in Table 1 below shows the inhibitory effect of various compositions described herein against the indicated organisms using the agar dilution test. Compositions A, B, C, D, E and F correspond respectively with the compositions of Examples 3, 2, 4, 5, 6 and 7, respectively. The figures under each composition represent the inhibitory concentration in micrograms per milliliter of the organotin-surfactant dissolved in water over a test period of 48 hours and 72 hours:

TABLE I.—AGAR DILUTION TEST

| | Compositions | | | | | |
|---|---|---|---|---|---|---|
| | A | B | C | D | E | F |
| Test Organisms—Inhibitory conc. μg./ml., 48 hours: | | | | | | |
| Staphylococcus aureus | 10 | 5 | 50 | 50 | 50 | 50 |
| Staphylococcus albus | 10 | 5 | 50 | 50 | 50 | 50 |
| Bacillus subtilis | 5 | 5 | 50 | 50 | 50 | 10 |
| Sarcina lutea | 5 | 5 | 50 | 50 | 50 | 50 |
| Mycobacterium tuberculosis (607) | 10 | 5 | 50 | 50 | 50 | 50 |
| Mycobacterium avim | 10 | 5 | 50 | 50 | 50 | 50 |
| Escherichia coli | 200 | 100 | 200 | 50 | 50 | 50 |
| Proteus vulgaris | 100 | 50 | 200 | 50 | 50 | 50 |
| Pseudomonas aeroginosa | 200 | 200 | | | | |
| Klebsiella pneumoniae | 50 | 10 | 100 | 50 | 50 | 50 |
| Shigella paradysenteriae | 50 | 50 | 200 | 100 | 50 | 10 |
| Saccharomyces pastorianus | 10 | 5 | 50 | 50 | 50 | 100 |
| Candida albicans | 50 | 5 | 50 | 200 | 100 | |
| Trichophyton rubrum | 10 | 1 | 5 | 5 | 50 | 50 |
| Trichophyton interdigitale | 5 | 1 | 10 | 5 | 50 | 50 |
| Brucella bronchiseptica | 50 | 50 | 200 | 100 | 50 | 50 |
| Vibrio metschnikovii | 50 | 10 | 50 | 50 | 50 | 50 |
| Bacterial Plant Pathogens—Inhibitory conc. μg./ml., 72 hours: | | | | | | |
| Erwinia amylovora | 100 | 50 | 100 | 100 | 50 | 50 |
| Erwina caratovors | | 200 | | 100 | 50 | 50 |
| Xanthomonas phaseoli | 100 | 50 | 100 | 100 | 50 | 50 |
| Xanthomonas pruni | 100 | 50 | | 100 | 50 | 50 |
| Fungal Plant Pathogens—Inhibitory conc. μg./ml., 72 hours: | | | | | | |
| Alternaria solani | 1 | 5 | 50 | 10 | 50 | 50 |
| Aspergillus niger | 50 | 10 | 100 | 50 | 200 | |
| Ceratostomella ulmi | 1 | 1 | 5 | 1 | 50 | 50 |
| Collectotrichum lagenarium | 5 | 1 | 5 | 5 | 50 | 100 |
| Colletotrichum phomoides | 5 | 1 | 5 | 5 | 50 | 100 |
| Colletotrichum pisi | 1 | 1 | 5 | 5 | 50 | 50 |
| Endoconidiophora fagacearum | 1 | 1 | 5 | 5 | 100 | 200 |
| Fusarium moniliforme | 10 | 5 | 50 | 10 | 200 | |
| Fusarium oxysporum lycopersici | 10 | 5 | 50 | 50 | 200 | |
| Glomerella cingulata | 1 | 1 | 5 | 5 | 50 | |
| Helminthosporium sativum | 1 | 1 | 1 | 5 | 50 | 200 |
| Penicillium expansum | 1 | 1 | 5 | 5 | 200 | |
| Pullularia sp | 5 | 1 | 5 | 5 | 50 | 50 |
| Verticillium albo-strum | 5 | 1 | 5 | 5 | 50 | 50 |

The following describes various procedures and observations made relative to the treatment of crops and weeds with aqueous solutions of the concentrates prepared herein:

*Test procedure.*—After the crops or weeds were treated with aqueous solutions of the organotin compositions at various rates per acre, the flats (i.e., flat boxes containing the treated material) were moved to the greenhouse, placed on the greenhouse tables and watered as necessary. From 10 to 13 days after treatment, a response rating was made. Each test plant species is rated as follows: In the following tables the column labeled (I.R.) Injury Rating is:

1=no injury, 2=slight, 3=moderate, 4=severe, 5=death of plant.

Under the column "Type," response is also coded by letter designation as follows:

A=abscission of leaves; defoliation
B=burned
C=chlorosis
D=death
E=epinasty
F=formative effects, besides epinasty
I=increased plant growth
L=local necrosis
N=no germination (Pre-emergence)
R=reduced germination (Pre-emergence)
S=stunting of plant growth
U=unclassified injury The pounds per acre referred to in Tables II and Table III represent pounds of organotin-surfactant concentrate utilized, the concentrate being dissolved in water for application purposes.

TABLE II.—HERBICIDAL AND PHYSIOLOGICAL ACTIVITY

[Composition A]

| | Pre-Emergence | | | | | | Post-Emergence | | | | | | | |
|---|---|---|---|---|---|---|---|---|---|---|---|---|---|---|
| | 2 lbs/acre | | 4 lbs/acre | | 8 lbs/acre | | 1 lb/acre | | 2 lbs/acre | | 4 lbs/acre | | 8 lbs/acre | |
| | I.R. | Type | I.R. | Type | I.R. | Type | I.R. | Type | I.R. | Type | I.R. | Type | I.R. | Type |
| Crops: | | | | | | | | | | | | | | |
| Corn | 1 | | 1 | | 1 | | 2 | B | 3 | BS | 5 | D | 5 | D |
| Cotton | 1 | | 1 | | 1 | | 3 | BS | 4 | BS | 5 | D | 5 | D |
| Soybeans | 1 | | 1 | | 1 | | 3 | BS | 4 | BS | 4 | BS | 4 | BS |
| Wheat | 2 | S | | | 2 | S | | | 2 | BS | | | 2 | BS |
| Alfalfa | 1 | | | | 3 | CS | | | 3 | BS | | | 5 | D |
| S. Beets | 1 | | | | 3 | RS | | | 4 | BS | | | 5 | D |
| Tomatoes | 1 | | | | 3 | RS | | | 5 | D | | | 5 | D |
| Flax | 1 | | | | 2 | CS | | | 4 | BS | | | 5 | D |
| R-Clover | 2 | S | | | 5 | N | | | 5 | D | | | 5 | D |
| Sorghum | 2 | S | | | 2 | S | | | 2 | BS | | | 5 | D |
| Weeds: | | | | | | | | | | | | | | |
| L. Crabgrass | 1 | | 3 | SC | 4 | SC | 3 | BS | 3 | BS | 4 | BS | 4 | BS |
| Mustard | 1 | | 2 | SC | 4 | SC(RSC) | 5 | D | 5 | D | 5 | D | 5 | D |
| Pigweed | 1 | | 3 | RS | 5 | N | 4 | BS | 5 | D | | | 5 | D |
| Ryegrass | | | | | | | | | | | | | | |
| S. Crabgrass | | | | | | | | | | | | | | |
| Foxtail | 1 | | 2 | S | 4 | SC | 2 | BS | 3 | BS | 4 | BS | 4 (5 | BS D) |
| Jap Millet | 2 | S | | | 3 | S | | | 4 | BS | | | 5 | D |
| Wild Oats | 1 | | | | 3 | S | | | 2 | BS | | | 4 | CBS |
| Nutgrass | 1 | | | | 1 | | | | 1 | | | | 2 | BC |
| Ragweed | 1 | | | | 1 | | | | 3 | BS | | | 5 | D |
| Smartweed | | | | | | | | | 2 | B | | | 5 | D |

TABLE III.—HERBICIDAL AND PHYSIOLOGICAL ACTIVITY

[Composition B]

| | Pre-Emergence | | | | | | Post-Emergence | | | | | | | |
|---|---|---|---|---|---|---|---|---|---|---|---|---|---|---|
| | 2 lbs./acre | | 4 lbs./acre | | 8 lbs./acre | | 1 lb./acre | | 2 lbs./acre | | 4 lbs./acre | | 8 lbs./acre | |
| | I.R. | Type | I.R. | Type | I.R. | Type | I.R. | Type | I.R. | Type | I.R. | Type | I.R. | Type |
| Crops: | | | | | | | | | | | | | | |
| Corn | 1 | | 1 | | 1 | | 3 | BSF | 3 | BSF | 4 | BSF | 5 | D |
| Cotton | 1 | | 1 | | 1 | | 3 | BS | 5 | D | 5 | D | 4 (5 | BS D) |
| Soybeans | 1 | | 1 | | 1 | | 3 | BS | 4 | BS | 5 | D | 5 | D |
| Wheat | 1 | | | | 1 | | | | 2 | BS | | | 3 | BS |
| Alfalfa | 2 | CBS | | | 5 | D | | | 4 | CBS | | | 5 | D |
| S. Beets | 1 | | | | 5 | N | | | 3 | CBS | | | 5 | D |
| Tomatoes | 2 | B | | | 5 | N | | | 5 | D | | | 5 | D |
| Flax | 2 | CB | | | 5 | D | | | 4 | BS | | | 5 | D |
| R-Clover | 4 | RSC | | | 5 | N | | | 5 | D | | | 5 | D |
| Sorghum | 1 | | | | 2 | S | | | 2 | BSA | | | 5 | D |
| Weeds: | | | | | | | | | | | | | | |
| L. Crabgrass | 3 | SC | 3 | SC | 4 | SCR | 3 | BS | 3 | BS | | | 5 | D |
| Mustard | 2 | SC | 3 | SC | 4 | RS | 5 | D | 5 | D | | | 5 | D |
| Pigweed | 2 | RS | 5 | N | 5 | N | 5 | D | 5 | D | | | 5 | D |
| Ryegrass | | | | | | | | | | | | | | |
| S. Crabgrass | | | | | | | | | | | | | | |
| Foxtail | 2 | S | 3 | SC | 4 | RSC | 2 | BS | 3 | BS | 5 | D | 5 | D |
| Jap. Millet | 2 | CS | | | 4 | RSC | | | 3 | BS | | | 5 | D |
| Wild Oats | 2 | S | | | 3 | SF | | | 2 | BS | | | 5 | D |
| Nutgrass | 1 | | | | 1 | | | | 1 | | | | 2 | B |
| Ragweed | 1 | | | | 3 | CS | | | 4 | BS | | | 5 | D |
| Ragweed | | | | | | | | | 2 | BS | | | 5 | D |

It will be recognized that various modifications may be made in the compositions exemplified above without deviating from the scope of the invention. Thus, for example, it has been found advantageous in some cases to modify the organotin composition to increase solubility or to clarify or decrease the viscosity of the concentrate as well as, in some cases, to accelerate the formation of aqueous solutions where higher than normal concentrations are desired. This may be accomplished by various methods such as by the use of coupling agents or in a number of cases by increasing the chloride ion concentration through the use of a reagent such as hydrochloric acid.

The dissolving of the organotin concentrates in water apparently takes place, at least in part, through a mechanism which involves the step of hydration, or addition of water, to the oxyalkylene radicals. A coupling agent accelerates this part of the mechanism because it is usually an agent which is soluble in both water and the organotin composition thus increasing the area of total contact between the water and the organotin concentrate. Water soluble alcohols which also exhibit good solubility for the organotin compositions (i.e., isopropanol) are typically suitable coupling agents although there are other compounds which function in this manner and can be used as coupling agents.

Solubility may also be increased, according to the invention, by increasing the concentration of desired ions and it has been found that the chloride ion is especially advantageous for this purpose. For example, the higher trialkyltin or triaryltin acetates and fluorides are in general less soluble in water by themselves than a number of other organotin compounds. These acetates are likewise weaker donors of electrons for forming a coordinate covalent bond with the surfactant as described above. However, it has been discovered that the organotin content in the compositions described in this invention can in these cases be increased by the addition of the chloride ion through hydrochloric acid. This is especially true where the surfactant is composed of a product derived by the condensation of an alkylene oxide (i.e., ethylene oxide) with an alkylated phenol or a suitable alkanol.

It will be understood that when describing the number of polyoxyalkylene groups present, this number is an average number as some of the hydrophobic radicals can have a few more and others a few less in the compositions described. Likewise, it is intended that a mixture of two different surfactants can be used to an advantage in some cases depending upon the nature of the organotin compound employed. For example, a surfactant which has only threshold solubility can be used with a surfactant containing 15 more oxyalkylene groups to produce organotin compositions of about the same solubility as one made by using the average number of oxyalkylene groups.

It should be obvious from what has been stated herein that consideration must be given to the nature of the organotin compound and the surfactant chosen as well as the type of use contemplated to give the most desirable organotin composition. In this respect, attention must be paid to the solubility of the organotin compound in the hydrophobic position; the nature of the surfactant and its efficiency as a donor of electrons; the nature and efficiency of the organotin compound as an acceptor of electrons to form a coordinate covalent bond; the values of the integers $x$ and $y$ as described above. For example, iso-octylphenol can be condensed with ethylene oxide to form the compound

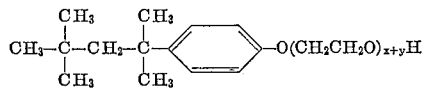

When the value of $x$ reaches 6 to 7 and the value of $y$ is zero, i.e., 6 to 7 moles of ethylene oxide condensed with one mole of iso-octylphenol, the threshold solubility is reached. This means that this product is soluble to the extent of 1% but not at 2%. Now if an additional 4 to 5 moles of ethylene oxide are condensed, the solubility of the product in water is above 3%. This means that $y$ in this example has a value of 4 to 5; $x$ has a value of 6 to 7 while $x+y$, the total number of oxyethylene groups condensed with iso-octylphenol, is 10 to 12. This is a satisfactory surfactant to be combined with organotin compounds to prepare compositions described in this invention.

Many different hydrophobic compounds have been found to give satisfactory results for condensation with alkylene oxides. The most desirable choice will be determined by considering the organotin compound, the concentration desired, the type solvent used and the end use. Naturally, depending upon the hydrophobic compound chosen the values of $x$ will vary to obtain threshold solubility. The value of $y$ has been found to be in the range 1 to 15. It should also be noted that once the threshold solubility has been reached, and more and more ethylene oxide is added, the oxyethylene chain length grows with each addition making the surfactant more and more water soluble. However, it is important to note that, in the case of the alkylaryl polyoxyethylene surfactant-organotin composition, a maximum water solubility is reached in the range when $y$ is 1 to 15 and this solubility rapidly drops off when 15 is reached.

Although most of the examples described above are with products derived from ethylene oxide, it has been found that propylene oxide with or without ethylene oxide can be used to advantage. Butylene oxide may also be used. The oxypropylene and oxybutylene radicals are less hydrophilic than oxyethylene so that a wide range of versatile products can be prepared when one considers aqueous and nonaqueous applications for the resulting organotin composition.

Although most of the organotin compositions are prepared by combining a previously prepared surfactant with the organotin compound, some of these compositions can be conveniently prepared by first adding the organotin compound to the hydrophobic compound, followed by the addition of ethylene oxide until the desired properties are obtained for the particular use in question.

It might be mentioned that the surfactants which contain nitrogen atoms form a basis for a more firm coordinate covalent bond and thus a more closely associated organotin-surfactant composition. This is based upon the fact that in general nitrogen atoms in many molecules are better donors of electrons than molecules which contain oxygen atoms. The latter are frequently only weakly associated with the organotin molecule.

An important consideration to be given to this invention is that it revolves around combinations of organotin compounds with surfactants regardless of what the mechanism is and while reference is given to the possibility of a coordinate bond existing, this is only given as a possible explanation of the unique results which are obtained and without limiting the invention thereto.

The term "surfactant" is generally used to describe surface active agents and covers emulsifiers, detergents, dispersing, wetting, penetrating, and suspending agents. In this respect, it is generally appreciated that surface-tension lowering is not necessarily a common denominator to all types of surface activity. Again, there appears to be no direct relationship between wetting power and surface tension lowering and practically no correlation with the emulsifying ability or detergency. Nevertheless, in this invention, it has been found that so long as the specifications outlined herein are met and the proper hydrophobic-oxyalkylene balance is maintained, any surfactant will be suitable for preparing organotin compositions.

The surfactant/organotin concentrates prepared herein, in liquid, solid, or paste form, are compatible with a wide variety of aqueous and nonaqeous products and are suitable in many types of finishes for textiles, latex- and oil-base paints, agricultural and apply sprays, cutting oils, oil-well applications, sanitary solutions for hospitals and the home, catalytic compositions for isocyanate and unsaturated-compound polymerization, paper mills for slime control, wood and lumber treatments to retard staining, shoe linings and leather.

The present organotin-surfactant compositions are unique in that they can be combined to advantage with many other materials. Typically, these products may be mixed with phenolic derivatives, organomercurials (e.g., phenyl mercuric acetate, ethyl mercuric acetate and ethyl-mercurythiosalicylic acid), quaternary compounds, such as quaternary ammonium bactericides, long-chain amines, and N-myristyl-3-hydroxy-butylamines as described in U.S. Patent 2,874,185. Combinations with other compatible herbicides, fungicides, insecticides, insect repellants and the like are also contemplated. In general, such combinations give a broader biocidal spectrum and, in certain cases, highly desirable synergistic effects. The present concentrates may also be used as rodent repellants alone or in admixture with other materials.

Bearing in mind the various modifications which may be made in the invention, including those referred to above and other obvious equivalents, the scope of the invention is defined in the following claims wherein

I claim:

1. A stable concentrate consisting essentially of one part by weight of an organotin compound selected from the group consisting of:

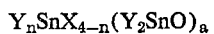

and

wherein $n$ is an integer from 1 to 3, Y is selected from the group consisting of alkyl from 1–18 carbon atoms, lower alkenyl, cyclohexyl, arylalkyl where the aryl is phenyl and the alkyl is lower alkyl, pheny, naphthyl, anthracenyl, pyridyl, furyl and thiophenyl; X is a radical attached to the tin by other than a (C=Sn) bond selected from the group consisting of the halide, sulphide, acyloxy of up to 18 carbon atoms, phenoxide, naphthoxide, alkyltinoxy, and mercaptobenzothiazolate; and $a$ has a value of at least 2, said compound being dissolved in from 0.25 to 9 parts by weight, of a surfactant having a critical balance of hydrophobic and hydrophilic groups therein whereby said tin compound remains dissolved in said surfactant on standing and does not separate out and the resulting single phase stable solution is soluble in water to give a stable solution, said surfactant having the formula:

$$R(R'O)_{x+y}H$$

wherein R is a hydrophobic radical selected from the group consisting of alkoxy containing from 8–18 carbon atoms, phenoxy, alkylphenoxy, fatty acid amido containing from 8–18 carbon atoms, abietyl, alkylamino wherein the alkyl contains from 8–18 carbon atoms and fatty acid containing from 12–18 carbon atoms (R'O) is oxyalkylene containing from 2 to 4 carbon atoms; $x$ is an integer equal to the total number of hydrophilic oxyalkylene groups required to give a threshold water solubility corresponding to about 1% by weight to the hydrophobic radical at room temperature while $y$ is an integer from 1 to 15 except that, in the case where R is one of the indicated amido and amino radicals and includes oxyalkylene $(R'O)_{x+y}$, the sum of the $x$'s equals the number of hydrophilic oxyalkylene groups required to give said threshold water solubility and the sum of the $y$'s is between 3 and 25.

2. A concentrate according to claim 1 wherein R is p-nonylphenoxy; (R'O) is an oxyethylene group and $x$ has a value between 4 and 6.

3. A composition according to claim 1 wherein the surfactant is one wherein R stands for a fatty acid amido radical and contains one to two N-substituted polyoxyalkylene groups.

4. A concentrate according to claim 1 wherein said organotin compound is a bis(trialkyltin)oxide.

5. A concentrate according to claim 1 wherein R is alkoxy in which the alkyl is a branched chain.

6. The concentrate of claim 1 wherein the organotin compound is tributyl tin oxide; R is alkoxy containing from 8–18 carbon atoms; (R'O) is oxyethylene; and $x$ has a value from 4 to 6.

7. The concentrate of claim 1 wherein the organotin compound is tributyl tin oxide; R is nonylphenoxy; (R'O) is oxyethylene; $x$ has a value from 4 to 6 and the sum of $x$ and $y$ does not exceed 9.

8. The concentrate of claim 1 wherein the organotin compound is a trialkyltin halide and the sum of $x+y$ is 7–8.

9. An aqueous solution having dissolved therein an effective amount of the concentrate of claim 1.

10. A composition according to claim 9 and including a water-soluble alcohol as a coupling agent.

11. A composition according to claim 10 wherein said coupling agent is isopropyl alcohol.

12. A concentrate according to claim 1 wherein said organotin compound is a trialkyltin halide.

13. A concentrate according to claim 1 wherein said organotin compound is a bis(trialkyltin) oxide.

14. A concentrate according to claim 1 wherein said surfactant is one having the formula:

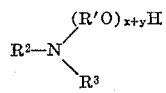

wherein (R'O) is oxyalkylene having 2–4 carbon atoms; $R^2$ and $R^3$ are alkyl containing from 8–18 carbon atoms; and $x+y$ have the values defined in claim 1.

15. A concentrate according to claim 1 wherein said surfactant is one having the formula:

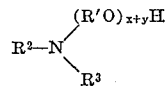

wherein (R'O) is oxyalkylene having 2–4 carbon atoms; $R^2$ is alkyl containing from 8–18 carbon atoms; $R^3$ is $(R'O)_{x+y}$ and $x+y$ have the values defined in claim 1.

16. A concentrate consisting essentially of tributyltin chloride completely dissolved in a surfactant of the formula:

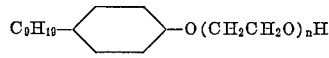

wherein $n$ is 9 to 10, the amount of said tin compound and surfactant being in the range of 1 part tin compound per .25 to 9 parts surfactant and effective to provide a single phase solution which is stable on standing and soluble in water to give a stable solution.

17. A concentrate consisting essentially of bis(tributyltin) oxide completely dissolved in a surfactant of the formula:

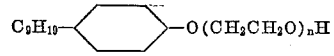

wherein n is 9 to 10, the amount of said tin compound and surfactant being in the range of 1 part tin compound per .25 to 9 parts surfactant and effective to provide a single phase solution which is stable on standing and soluble in water to give a stable solution.

References Cited by the Examiner

UNITED STATES PATENTS

| | | | |
|---|---|---|---|
| 2,789,060 | 4/1957 | Spangenberg et al. | 106—15 |
| 2,809,937 | 10/1957 | Gray | 252—106 |
| 2,824,825 | 2/1958 | Fath et al. | 167—42 |
| 2,828,198 | 3/1958 | Harris et al. | 71—2.3 |
| 2,843,471 | 7/1958 | Fischer | 71—2.6 |
| 2,878,155 | 3/1959 | Cruickshank | 167—22 |
| 2,882,140 | 4/1959 | Searle | 71—2.3 |
| 2,898,267 | 8/1959 | Lindner | 167—42 |
| 2,904,421 | 9/1959 | Seaton | 71—2.3 |
| 2,915,559 | 12/1959 | Horsley et al. | 167—42 X |
| 2,922,738 | 1/1960 | McDermott et al. | 167—30 |
| 3,070,433 | 12/1962 | Schlor et al. | 71—2.7 |

FOREIGN PATENTS

| | | |
|---|---|---|
| 215,713 | 6/1958 | Australia. |
| 806,535 | 12/1958 | Great Britain. |

OTHER REFERENCES

Van der Kerk, "J. App. Chem.," vol. 4, June 1954, pages 314–318.

Stanley, "Manufacturing Chemist," September 1958, pages 385–388.

JULIAN S. LEVITT, *Primary Examiner.*

M. A. BRINDISI, L. GOTTS, *Examiners.*

UNITED STATES PATENT OFFICE
CERTIFICATE OF CORRECTION

Patent No. 3,222,158

December 7, 1965

Frank J. Sowa

It is certified that error appears in the above identified patent and that said Letters Patent are hereby corrected as shown below:

Column 18, line 74, for "$Y_n SnX_{4-n}(Y_2 SnO)_a$" read -- $Y_n SnX_{4-n}, (Y_2 SnO)_a$ --; column 19, line 6, for "(C=Sn)" read -- (C-Sn) --.

Signed and sealed this 22nd day of July 1969.

(SEAL)
Attest:

Edward M. Fletcher, Jr.
Attesting Officer

WILLIAM E. SCHUYLER, JR.
Commissioner of Patents